Figures 1, 2:
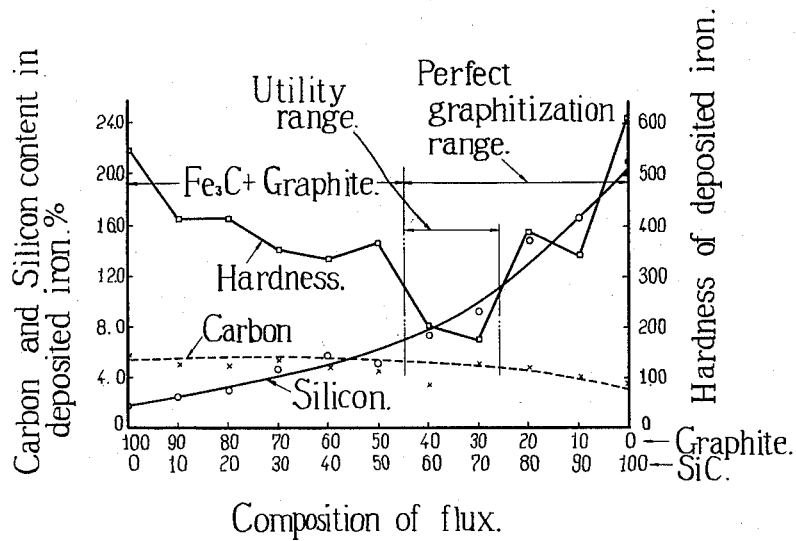

INVENTOR.
BY Kiyoshi Yokota

3,166,437
METHOD FOR MAKING A SILICON COATED CORE WIRE FOR WELDING CAST IRON

Kiyoshi Yokota, 537-1 Minami-tanaka-machi, Nerima-ku, Tokyo, Japan
Filed Sept. 6, 1960, Ser. No. 54,038
Claims priority, application Japan, Sept. 10, 1959, 34/28,651
4 Claims. (Cl. 117—202)

The invention resides in a ferrous core wire of electrodes for welding cast iron, the core wire being characterized in that it contains 5–12% Si, which has been diffused by siliconizing process.

As commonly known to those skilled in the art, problems arise in the course of welding cast iron. Generally speaking, these problems are caused principally by a relatively higher cooling rate during the welding and thus the deposited iron is subject to insufficient graphitization, which in turn results in the formation of white pig iron accompanied simultaneously by increased hardening effect. The welds so produced provide extraordinary higher hardness and are liable to develop crackings and other defects, thus representing poor machinability of the welded products.

In order to avoid these drawbacks, various welding electrodes employing ferrous or non-ferrous core material are employed. It can be stated, however, that too few reliable cast iron welding techniques and welding electrodes utilizable therefore have been developed with satisfactory results.

The present invention is based upon the observation that the most important requirement to obviate the aforementioned difficulties resides in that the weld deposit should contain sufficient quantities of both carbon and silicon to satisfactorily graphitize the carbon contained in the welds in spite of the relatively higher cooling rate thereof, the matrix thereby becoming sufficiently ductile. Preliminary experiments were carried out, wherein electrodes comprising soft steel core wires coated with a flux layer consisting of a variable mixture of graphite and Carborundum (SiC) as the source for supplying the necessary carbon and silicon, were employed and relations among the mixing ratio of graphite and Carborundum affecting residual contents of carbon and silicon in deposited iron, the degree of graphitization and the hardness obtainable were investigated.

The graph sets forth the results of these preliminary experiments, FIGURE 1 especially showing relations obtained therefrom between the mixing ratio of graphite and Carborundum contained in the flux layer coated on soft steel core wires, on the one hand, and the carbon and silicon contents of the deposits and the hardness thereof, on the other hand, and FIGURE 2 being a flow sheet which in diagram form illustrates the process.

It was found from these experiments, as illustrated diagrammatically in the drawing, that with a mixing range of 55–75% of Carborundum and residue of graphite, the carbon contained in the welded deposits was perfectly graphitized, the matrix comprised ferrite, and the hardness thereof amounted to 180–220 Vickers, that is, the normal range of hardness as met with common iron castings. Under these conditons, the silicon content of the deposited iron amounted to 7–11% and the carbon content to about 4%. With the welding process, wherein flux is utilized as the supplying source of silicon, an appreciable loss of silicon is unavoidably encountered partially by oxidation thereof under the influence of an arc of highly elevated temperature, and partly by being blown away by the arc. In addition, it is extremely difficult to maintain the silicon content in the welds at a predetermined value.

These drawbacks in using a flux as the supplying source of silicon can be completely obviated according to the invention, wherein high silicon ferrous wires having a silicon content of 5–12% are employed as the core wires of welding electrodes, said silicon being diffused in the original ferrous wires by a siliconizing process, more specifically a case siliconizing process. The invention is, therefore, characterized in the employment of such core wires as containing per se a large quantity of silicon, thus reducing otherwise possible losses of silicon to a minimum as in a conventional flux having a high content of silicon as the supply source thereof. In this way, a sufficient quantity of silicon to completely graphitize the carbon contained in the deposited iron, regardless of the occasional cooling rate thereof, more specifically 7–8% of silicon content, can be supplied to the welds in an effective and economical maner. As is commonly known to those skilled in the art, it is practically impossible to subject high silicon iron having a silicon content of 5% or higher to a forging, rolling or wire drawing operation, because of its poor ductility, and thus production of welding electrodes of this kind relying upon these metal working procedures are practically inhibited. On the other hand, according to this invention, the ferrous wires or rods of the required diameter are incorporated with a high content of silicon by the case siliconizing process, and the above mentioned difficulties can thereby be completely avoided, which is an appreciable advancement in the welding technique.

A preferred example will be described in detail for better understanding of the invention which should be taken in conjunction with the flow sheet:

EXAMPLE

Core wires of the kind, Class 1, Group 1, according to the Japanese Industrial Standards, having a diameter of 3.2 millimeters and containing a carbon content of less than 0.1% and silicon content of less than 0.03% are embedded in a mass of pulverized alumina, and heated to a temperature ranging from 1000 to 1100° C. for 6 hours in the atmosphere of a gas developed by heating a pulverized mixture of ferrosilicon and ammonium chloride. By this siliconizing process, the core wires are incorporated with a silicon content of 9% in the mean.

Next, composite fluxes as listed in columns A and B in the following table are coated upon the case siliconized core wires and the plain or untreated cores, respectively, in a layer about 1.2 millimeters thick, and dried. With these two types of electrodes, welding is carried out on a cold cast iron product in the form of single beads with a current of 150 amperes and at a welding speed of about 200 millimeters per minute to investigate the case of relatively higher cooling rate. The results of chemical analysis of the thus deposited irons are also listed in the table. As will be noted therefrom, the silicon contents in both cases are substantially the same and the hardness of the deposits produced according to this invention amounts to about 180 Vickers, thus showing the effects of fully graphitized carbon content contained in the welds. As will be appreciated from the table, the mixing quantity of Carborundum in the novel process A nevertheless amounts to only about 1/25 that required for the specific conventional welding process B.

Table

| Designation of experiment | A | B |
|---|---|---|
| Core electrode | Case siliconized core wire | Plain or non-treated soft steel core wire |
| Flux: | | |
| Graphite, percent | 70 | 21 |
| Carborundum, percent | 2 | 49 |
| Barium carbonate, percent | 1 | 1 |
| Asbestos, percent | 9 | 9 |
| Natrium silicate, percent | 18 | 20 |
| Chemical composition of deposited iron: | | |
| Carbon, percent | 3.56 | 5.47 |
| Silicon, percent | 9.4 | 9.25 |
| Hardness Vickers | 180 | 175 |

While there has been shown and described a particular example of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A process of producing cast iron welding electrodes, comprising imbedding iron wire having a carbon content of less than 0.1% and having a silicon content of less than 0.03% in a mass of pulverized alumina, then heating the mass and iron wire from between about 1000° C. to 1100° C. for a sufficient period of time in an atmosphere produced by heating a pulverized mixture of ferro silicon and ammonium chloride whereby the silicon is diffused into the iron in a quantity to constitute 5–12% by weight of the wire.

2. The process of claim 1 wherein the period of time is six hours, the wire has a diameter of 3.2 millimeters and the quantity of silicon is approximately 9% by weight of the wire.

3. A process of producing cast iron welding electrodes, comprising imbedding iron wire having a carbon content of less than 0.1% and having a silicon content of less than 0.03% in a mass of pulverized alumina, then heating the mass and iron wire from between about 1000° C. to 1100° C. for a sufficient period of time in an atmosphere produced by heating a pulverized mixture of ferro silicon and ammonium chloride whereby the silicon is diffused into the iron in a quantity to constitute 5–12% by weight of the wire, thereafter coating the wire with a flux.

4. The process of claim 3 wherein the period of time is six hours, the wire has a diameter of 3.2 millimeters, the quantity of silicon is approximately 9% by weight of the wire and the flux coating has a thickness of approximately 1.2 millimeters.

References Cited by the Examiner

UNITED STATES PATENTS

| 1,873,340 | 8/32 | Scollard et al. | 117—202 |
| 1,916,206 | 7/33 | Dawson | 117—207 |
| 2,501,051 | 3/50 | Henderson et al. | 117—106 |

FOREIGN PATENTS

| 583,099 | 12/46 | Great Britain. |
| 119,772 | 4/27 | Switzerland. |
| 180,187 | 11/54 | Austria. |

OTHER REFERENCES

Powell et al.: Vapor Plating, John Wiley & Sons, Inc., N.Y., 1956 (pages 126, 127, and 130 relied on).

RICHARD D. NEVIUS, *Primary Examiner.*

JOSEPH B. SPENCER, *Examiner.*